(12) United States Patent
Zhang et al.

(10) Patent No.: US 11,400,407 B2
(45) Date of Patent: Aug. 2, 2022

(54) DECOMPOSITION METHOD AND APPARATUS BASED ON BASIS MATERIAL COMBINATION

(71) Applicants: NUCTECH COMPANY LIMITED, Beijing (CN); TSINGHUA UNIVERSITY, Beijing (CN)

(72) Inventors: Qingjun Zhang, Beijing (CN); Yuanjing Li, Beijing (CN); Zhiqiang Chen, Beijing (CN); Ziran Zhao, Beijing (CN); Yinong Liu, Beijing (CN); Yaohong Liu, Beijing (CN); Lili Yan, Beijing (CN); Ge Li, Beijing (CN); Qiufeng Ma, Beijing (CN); Nan Bai, Beijing (CN)

( * ) Notice: Subject to any disclaimer, the term of this patent is extended or adjusted under 35 U.S.C. 154(b) by 884 days.

(21) Appl. No.: 16/232,050

(22) Filed: Dec. 26, 2018

(65) Prior Publication Data
US 2019/0193017 A1    Jun. 27, 2019

(30) Foreign Application Priority Data

Dec. 26, 2017    (CN) .......................... 201711432909.4

(51) Int. Cl.
*B01D 53/02*    (2006.01)
*B01D 53/04*    (2006.01)
(Continued)

(52) U.S. Cl.
CPC ....... *B01D 53/0446* (2013.01); *B01D 53/025* (2013.01); *B01D 53/0407* (2013.01);
(Continued)

(58) Field of Classification Search
CPC ............ B01D 2257/80; B01D 2258/06; B01D 2259/4003; B01D 2259/40086;
(Continued)

(56) References Cited

U.S. PATENT DOCUMENTS 3,621,585 A * 11/1971 Robertson ............... F26B 17/14
34/375
4,023,940 A * 5/1977 Shultz ................ B01D 53/0454
96/112
(Continued)

FOREIGN PATENT DOCUMENTS

CN    103515182 A    1/2014

OTHER PUBLICATIONS

Combined Search and Examination Report dated Jun. 20, 2019 in the corresponding GB application (application No. GB1820979.1).

*Primary Examiner* — Christopher P Jones
(74) *Attorney, Agent, or Firm* — Kilpatrick Townsend & Stockton, LLP

(57) ABSTRACT

The present disclosure relates to a gas purification apparatus and a trace substance detection device. The gas purification apparatus includes a first purification component, a second purification component and a switching component, wherein the switching component can be switched between a first state and a second state, the first purification component and a component to be purified form a gas purification loop in the first state, and the second purification component can provide a regeneration gas for the first purification component in the second state, so that water vapor and impurities in the first purification component are discharged to outside. In the gas purification apparatus, the filtered air is used as the regeneration gas to prevent secondary pollution in a recycling process of the purificant; furthermore, by means of the state switching function of the switching component, the mutual interference between the two working states of purification and regeneration can be prevented, and all the above advantages can improve the reliability of the recycling of the purificant, thereby optimizing the performance and the service life of the gas purification apparatus.

15 Claims, 2 Drawing Sheets

(51) Int. Cl.
  *G01N 27/622* (2021.01)
  *G01N 30/26* (2006.01)
  *B01D 53/26* (2006.01)
  *G01N 30/02* (2006.01)

(52) U.S. Cl.
  CPC ....... *B01D 53/0438* (2013.01); *G01N 27/622* (2013.01); *G01N 30/26* (2013.01); *B01D 53/261* (2013.01); *B01D 2257/80* (2013.01); *B01D 2258/06* (2013.01); *B01D 2259/402* (2013.01); *B01D 2259/40003* (2013.01); *B01D 2259/40086* (2013.01); *B01D 2259/40096* (2013.01); *G01N 2030/025* (2013.01)

(58) Field of Classification Search
  CPC .... B01D 2259/40096; B01D 2259/402; B01D 53/025; B01D 53/0407; B01D 53/0438; B01D 53/0446; B01D 53/261; G01N 30/26
  See application file for complete search history.

(56) References Cited

U.S. PATENT DOCUMENTS

| | | | | |
|---|---|---|---|---|
| 4,516,985 | A | * | 5/1985 | Winter ................... B01D 53/04 95/14 |
| 2013/0263737 | A1 | | 10/2013 | Lee et al. |
| 2016/0356679 | A1 | * | 12/2016 | Zhang ................... G01N 30/30 |
| 2018/0172650 | A1 | * | 6/2018 | Platow ................... G01N 1/405 |

* cited by examiner

DECOMPOSITION METHOD AND APPARATUS BASED ON BASIS MATERIAL COMBINATION

CROSS-REFERENCES TO RELATED APPLICATIONS

The present application claims priority of Chinese application No. 201711432909.4, filed on Dec. 26, 2017. The disclosed content of the Chinese application is hereby entirely incorporated into the present disclosure.

FIELD

The present disclosure relates to the technical field of rapid detection of trace substances, and in particular to a gas purification apparatus and a trace substance detection device.

BACKGROUND

In order to keep the cleanness of a gas in a trace detection device such as an ion mobility spectrometer, a purification treatment is performed on the gas entering the ion mobility spectrometer by using a gas purification apparatus in general. In a gas purification process, the water vapor and impurities in the air are mainly removed by a purificant in the gas purification apparatus to generate zero gas (clean air containing no to-be-detected component or interfering substance).

Some existing ion mobility spectrometers use a single gas purification apparatus, the purificant is placed in the gas purification apparatus to purify the gas and needs to be replaced periodically within a short time, the ion mobility spectrometer needs to be stopped during the replacement and cannot work continuously, and the maintenance cost is high. Some ion mobility spectrometers adopt two gas purification apparatuses, the purificant is placed in the gas purification apparatuses to purify the gas in turn, that is, during the replacement of one gas purification apparatus, the other gas purification apparatus is used, therefore continuous work is achieved, but the purificant still needs to be replaced periodically by workers, and the purificant cannot be recycled. Therefore, the gas purification apparatus in the existing ion mobility spectrometer has the disadvantages of requirement for manual operation and replacement, low working efficiency and high cost; or two sets of purification apparatuses are required to be switched for use, which increases the weight of the ion mobility spectrum and is not convenient to carry.

In order to achieve long-term use of the purificant, a gas purification apparatus for regenerating the purificant appears in the prior art to achieve the effect of recycling the purificant. When the purificant is heated, the air is injected from the outside of the purification apparatus to serve as a regeneration gas so as to facilitate discharging the water vapor and the impurities in the purificant. Although the gas purification apparatus avoids the regular replacement of the purificant, and the performance and the service life of the purifier can be improved. However, it is found in the actual use process that the regeneration effect of the purificant is not good in this way, and it is difficult to achieve a superior purification effect of the gas purification apparatus.

SUMMARY

The embodiment of the present disclosure provides a gas purification apparatus and a trace substance detection device, which can optimize the gas purification effect of the purification apparatus.

In order to achieve the above objective, a first aspect of the embodiment of the present disclosure provides a gas purification apparatus, including a first purification component, a second purification component and a switching component, the switching component can be switched between a first state and a second state, the first purification component and a component to be purified form a gas purification loop in the first state, and the second purification component provides a regeneration gas for the first purification component in the second state, so that water vapor and impurities in the first purification component are discharged to outside.

In some embodiments, the switching component is a switching valve.

In some embodiments, the switching component includes a first switching valve and a second switching valve, when both of the first switching valve and the second switching valve are in the first state, the first purification component and the component to be purified form the gas purification loop, and when both of the first switching valve and the second switching valve are in the second state, the second purification component provides the regeneration gas for the first purification component through the second switching valve, so as to discharge the water vapor and impurities regenerated by the first purification component to outside by sweeping.

In some embodiments, the gas purification apparatus further includes a shell provided with a gas tube interface, and when the second switching valve is in the second state, the second purification component communicates with the second switching valve from the outside of the shell through the gas tube interface.

In some embodiments, the first purification component includes a first purification container, a first purificant and a heater, the first purificant is provided in the first purification container, and the heater is arranged at the outside of the first purification container for heating when the first purificant needs to be regenerated.

In some embodiments, the gas purification apparatus further includes a shell, the shell is provided with a power supply interface, and the heater is connected with the power supply interface, and the heater can be powered by an external power supply when the first purificant needs to be regenerated.

In some embodiments, the gas purification apparatus further includes a shell provided with a power supply interface, the switching valve is a solenoid valve, the two-position correspond to the first state and the second state respectively, the solenoid valve is connected with the power supply interface, the solenoid valve can be powered by the external power supply, the first state is a power-off state of the solenoid valve, and the second state is a power-on state of the solenoid valve.

In some embodiments, the first purification component further includes a heat preservation layer coated at the outside of the first purification container.

In some embodiments, a temperature and humidity sensor is provided in the first purification container for monitoring the temperature and humidity of the first purificant.

In some embodiments, the gas purification apparatus further includes a shell, a battery and a charging component, the shell is provided with a charging interface, the battery is provided in the shell and is connected with the charging interface, and the charging interface can charge the battery when being connected with the charging component.

In some embodiments, the first switching valve and the second switching valve are both two-position three-way solenoid valves.

In some embodiments, the gas purification apparatus further includes a pump provided on a gas path between the second switching valve and the first purification component.

In some embodiments, the component to be purified comprises an ion migration tube.

In order to achieve the above objective, a second aspect of the embodiment of the present disclosure provides a trace substance detection device, including the gas purification apparatus of the above embodiments.

In some embodiments, the trace substance detection device comprises an ion mobility spectrometer or a gas chromatograph.

Based on the above technical solutions, in the gas purification apparatus in one embodiment of the present disclosure, in the first state, the first purification component and the component to be purified form the gas purification loop, and in the second state, the second purification component provides the purified regeneration gas for the first purification component to promote to discharge the water vapor and impurities in the first purification component to outside. In the gas purification apparatus, the filtered gas is used as the regeneration gas to prevent secondary pollution in a recycling process of the purificant; furthermore, by means of the state switching function of the switching component, the recycling is performed on the purificant in a non-purification state to prevent the mutual interference between the two working states of purification and regeneration, and all the above advantages can improve the reliability of the recycling of the purificant, thereby optimizing the performance and the service life of the gas purification apparatus.

BRIEF DESCRIPTION OF THE DRAWINGS

The drawings described herein are used for providing a further understanding of the present disclosure, and constitute a part of the present disclosure. The illustrative embodiments of the present disclosure and the description thereof are used for explaining the present disclosure and do not constitute undue limitations to the present disclosure. In the drawings.

DETAILED DESCRIPTION OF THE INVENTION

Figure 1:
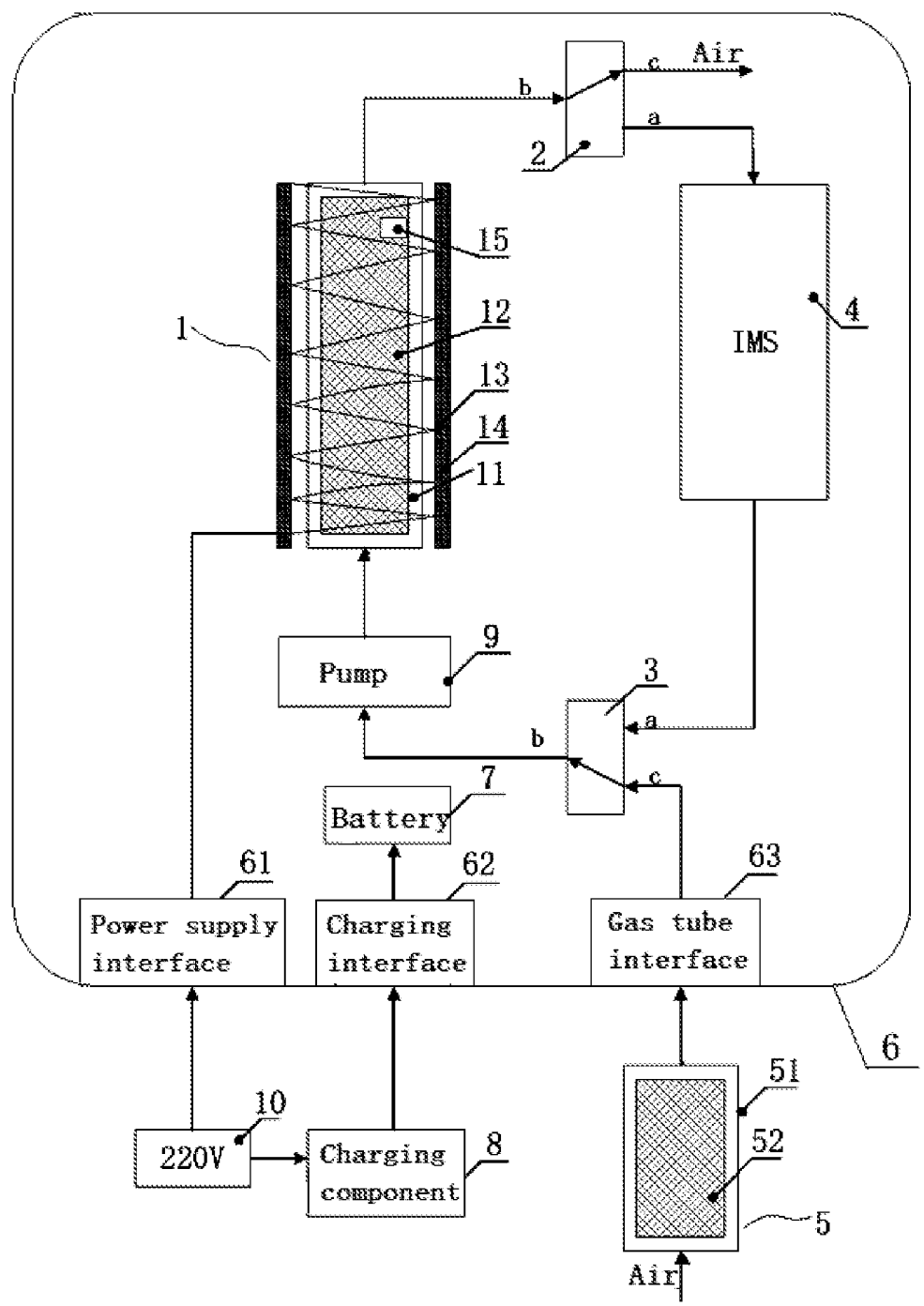
FIG. 1 is a schematic diagram of a recycling state of a purificant of an embodiment of a gas purification apparatus of the present disclosure.

The present disclosure is described in detail below. In the following paragraphs, different aspects of the embodiments are defined in more detail. The aspects so defined may be combined with any other one or more aspects, unless clearly indicated that they cannot be combined. In particular, any feature that is considered to be advantageous may be combined with other one or more features that are considered advantageous.

The terms "first", "second" and the like appearing in the present disclosure are merely for the convenience of description to distinguish different components having the same name, and do not indicate sequential or primary and secondary relationship.

In the description of the present disclosure, the orientation or position relationships indicted by "upper", "lower", "top", "bottom", "front", "back", "inside" and "outside" are orientation or position relationships shown in the drawings, are merely used for conveniently describing the present disclosure, rather than indicating or implying that the apparatus referred to has a specific orientation, is constructed and operated in a specific orientation, and thus cannot be construed as limitations to the protection the scope of the present disclosure.

The inventor finds that the solution in the prior art is difficult to achieve a good recycling effect on the purificant. The main reason is that the external air is input in a heating regeneration process, the air is not filtered and is likely to cause secondary pollution to the purificant subjected to the heating regeneration, thereby affecting the regeneration effect of the purificant, and then the purification effect of the purification apparatus on the gas is affected.

Figure 2:
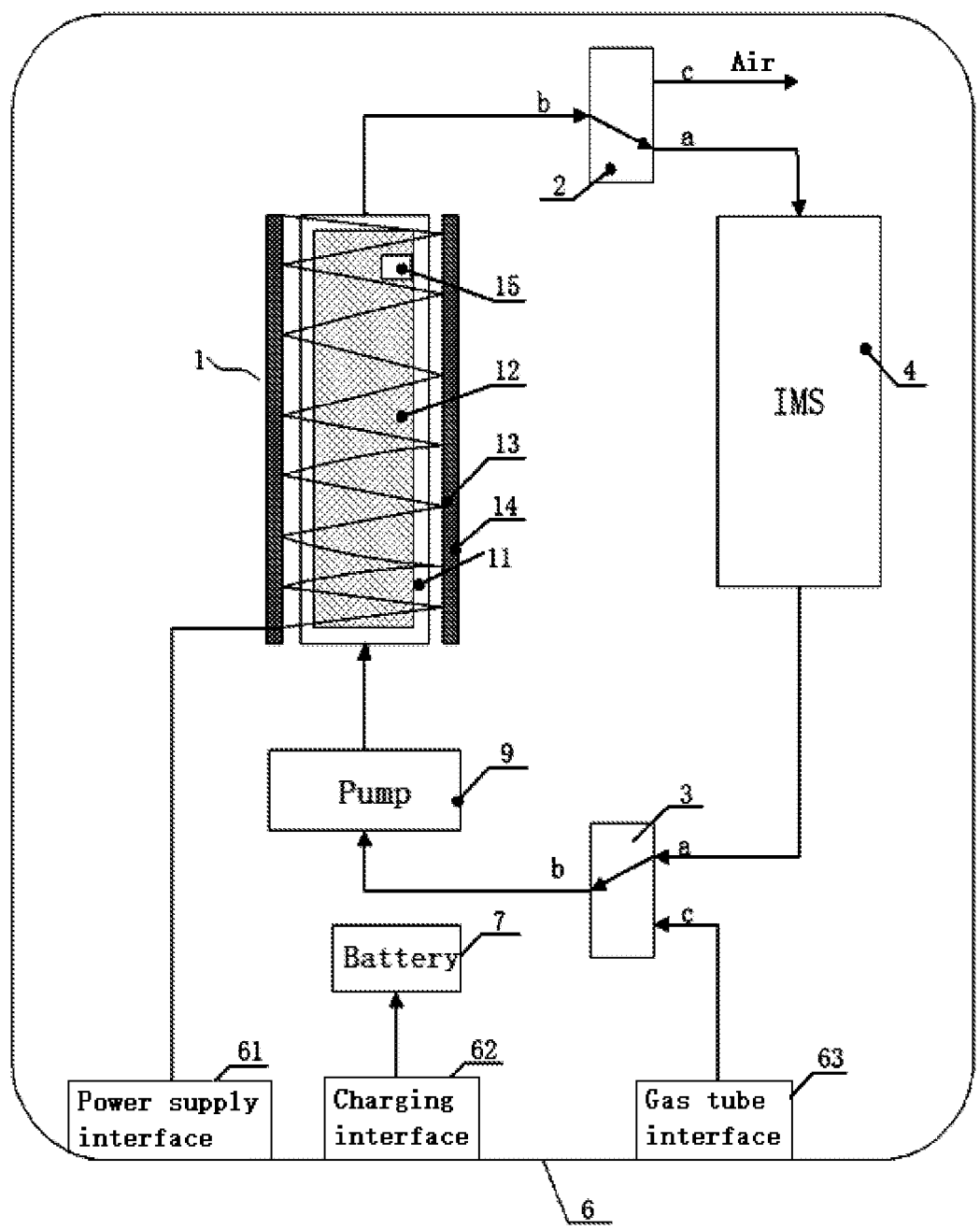
FIG. 2 is a schematic diagram of a gas purification state of an embodiment of a gas purification apparatus of the present disclosure.

In accordance with this improvement idea, the present disclosure provides a gas purification apparatus, as shown in conjunction with FIGS. 1 and 2, in some embodiments, the gas purification apparatus includes a first purification component 1, a second purification component 5 and a switching component, and the switching component can be switched between a first state and a second state. When the switching component is in the first state, the first purification component 1 and a component to be purified form a gas purification loop, and the first purification component 1 performs purification filtering on the air in the component to be purified to remove impurities. When the switching component is in the second state, the second purification component 5 can suck an external gas (for example, the air), perform purification filtering, and provide the purified gas to the first purification component 1 to serve as a regeneration gas so as to promote the water vapor and impurities of the first purification component 1 to flow outward during the recycling of the first purification component 1, in order to form a recycling path. In the recycling process of the purificant, the gas purification loop is in a disconnected state.

For example, when the gas purification apparatus is used in an ion mobility spectrometer, the component to be purified may be an ion migration tube 4, referred to as IMS. When the gas purification apparatus is used for gas purification in other instruments, the component to be purified can also be a component that performs a corresponding function. The respective embodiments given below are described by taking it as an example that the gas purification apparatus is used in the ion mobility spectrometer.

The gas purification apparatus in the embodiment of the present disclosure utilizes the filtered air as the regeneration gas to prevent secondary pollution in the recycling process of the purificant; furthermore, by means of the state switching function of the switching component, the recycling is performed on the purificant in a non-purification state to prevent the mutual restriction between the two working states of purification and regeneration, that is, the purificant is not regenerated in the purification working state, and the purification work is not performed in the purificant recycling working state to avoid mutual interference. the advantages of the above two aspects can improve the reliability of the recycling of the purificant, thereby optimizing the performance and the service life of the gas purification apparatus.

In some embodiments, the switching component is a switching valve. By switching the working position of the switching valve, the switching valve is switched between the first state and the second state, so that the gas purification apparatus can transform between the purification working state and the purificant recycling working state conveniently, reliably and quickly. Moreover, when the switching valve is in the first state, the purificant recycling path is disconnected, and when the switching valve is in the second state, the gas purification loop is disconnected, so that the mutual interference between the two working states of purification and regeneration can be reliably prevented, and the performance of the gas purification apparatus is optimized. Alternatively, the switching component can also select a change-over switch or other structural member or the like capable of achieving state conversion by motion.

Compared with the switching component that achieves state conversion by the structural member, the switching valve of the present application has a simple structure and is easy to assemble, the switching between the two states can be achieved just by controlling the connection and disconnection, and the control of a motion travel of the structural member is not involved, so that the control is simple and reliable.

In some embodiments, as shown in FIG. 1, the switching component includes a first switching valve 2 and a second switching valve 3. When the first switching valve 2 and the second switching valve 3 are both in the first state (as shown in FIG. 2), the first purification component 1 and the component to be purified form the gas purification loop. When the first switching valve 2 and the second switching valve 3 are both in the second state (as shown in FIG. 1), the second purification component 5 provides the regeneration gas for the first purification component 1 through the second switching valve 3 to promote to discharge the water vapor and impurities in the first purification component 1 to outside through the first switching valve 2 in a purificant recycling process. In the second state, the second purification component 5, the second switching valve 3, the first purification component 1 and the first switching valve 2 sequentially communicate with each other to form a purificant recycling path.

For example, the first switching valve 2 and the second switching valve 3 are both two-position three-way solenoid valves.

The first switching valve 2 is used for controlling a communication relationship between the outlet of the first purification component 1 and the component to be purified, or between the outlet of the first purification component 1 and the outside, and the second switching valve 3 is used for controlling the communication relationship between the inlet of the first purification component 1 and the component to be purified, or between the first purification component 1 and the second purification component 5.

In the present embodiment, by means of the cooperative use of the two independent switching valves, the purificant can be regenerated, and the non-maintenance of the purificant in the ion mobility spectrometer is achieved; moreover, the internal gas pipeline can be flexibly arranged to reduce the volume of the gas purification apparatus; and in addition, the gas purification apparatus can transform between the purification working state and the purificant recycling working state conveniently, reliably and quickly.

In addition to the cooperative use manner of the two independent solenoid valves, one switching valve can also be adopted for implementation, so that the space can be saved, and the volume of the gas purification apparatus is reduced. For example, in some embodiments, the two switching valves are designed into an integrated structure, but are independent from each other in control. In some embodiments, the switching valves are designed in the form of double channels. For example, when the solenoid valve is used, when the same electromagnet is controlled, the two channels can be simultaneously switched to the first state, or simultaneously switched to the second state, so that the control reliability of the working state of the gas purification apparatus is improved, and the situation of mismatch of the working states of the two switching valves due to the occurrence of erroneous control is avoided.

Based on the above embodiment, the gas purification apparatus of the present disclosure further includes a shell 6, the shell 6 is provided with a gas tube interface 63, and when the second switching valve 3 is in the second state, the second purification component 5 can communicate with the second switching valve 3 from the outside of the shell 6 through the gas tube interface 63.

The purpose of setting the gas tube interface 63 is to communicate with the second purification component 5 when the first purification component 1 is in a heating regeneration state, the external air enters the second purification component 5, the water vapor and impurities therein are removed by the second purification component 5 to obtain a purified gas, the purified gas is supplied to the first purification component 1 through the second switching valve 3 to serve as the regeneration gas so as to sweep the water vapor and impurities in the purificant of the first purification component 1, and the purified gas is finally discharged to the atmosphere through the first switching valve 2.

The second purification component 5 is located at the outside of the shell 6, as shown in FIG. 1, when the purificant needs to be recycled, the second purification component 5 is installed on the gas tube interface 63 to communicate with the first purification component 1 through the second switching valve 3. As shown in FIG. 2, when the gas needs to be purified, the second purification component 5 is pulled off from the gas tube interface 63, and the gas purification apparatus can be flexibly and conveniently carried to a desired place. By designing the second purification component 5 to be external and detachable from the shell 6, the complexity of the internal structure of the shell 6 can be reduced, the volume and the weight of the gas purification apparatus can be reduced, and portability can be improved.

The structural form of the first purification component 1 is given below. As shown in FIG. 1, the first purification component 1 includes a first purification container 11, a first purificant 12 and a heater 13. the first purification container 11 can be a cylindrical structure and is provided with a gas inlet and an outlet, the first purificant 12 is provided in the first purification container 11, the gas is purified in a process of passing through the first purificant 12 after entering the first purification container 11 from the gas inlet, and the purified gas flows out through the outlet. The heater 13 is arranged at the outside of the first purification container 11 for heating when the first purificant 12 needs to be regenerated, thereby increasing the temperature of the first purificant 12 to volatilize the water vapor and foreign matters from the first purificant 12.

For example, the heater 13 can be an electric heating wire wound on an outer wall of the first purification container 11, or the heater 13 can be an electric heating tube placed on the outer wall of the first purification container 11, or is a heating apparatus arranged at the bottom of the first purification container 11.

When the gas purification apparatus is used in the ion mobility spectrometer, the component to be purified is an ion migration tube 4, and the first purification component 1 is used for purifying the gas in the ion migration tube 4, and supplying the purified gas to the ion migration tube 4 to serve as a migration gas and a carrier gas of the ion migration tube 4.

Further, a power supply interface 61 can be further provided on the shell 6, the heater 13 is connected with the power supply interface 61, and the heater 13 can be powered by an external power supply 10 when the first purificant 12 needs to be regenerated. The heater 13 can heat the first purificant 12 through the first purification container 11 to volatilize the water vapor and impurities in the first purificant 12.

The present embodiment has the advantages that, when the first purificant 12 needs to be heated in the recycling state, the power is supplied by the external power supply 10 instead of by the battery, so that the working energy consumption of the ion mobility spectrometer is reduced, the capacity of the battery can be reduced, and the service life of the battery is prolonged, and by reducing the capacity of the battery and the volume of the purification container, the weight of the ion mobility spectrometer is reduced, the volume is reduced, and the portability is improved.

Further, with reference to FIG. 1 or FIG. 2, by setting the power supply interface 61 on the shell 6, when the switching valve is the solenoid valve, the solenoid valve is connected with the power supply interface 61, the external power supply 10 can be converted into a suitable voltage to supply power to the solenoid valve, the first state corresponds to a power-off state of the solenoid valve, and the second state corresponds to a power-on state of the solenoid valve. When the power supply interface 61 is not connected to the external power supply 10, the solenoid valve is in the power-off state, the gas purification loop of the gas purification apparatus is turned on, and the first purification component 1 provides the purified gas for the ion migration tube 4. When the power supply interface 61 is connected with the external power supply 10, for example, an external power supply of 220V, the external power supply 10 supplies power to the heater 13 to heat the first purification component 1 so as to recycle the purificant, meanwhile, the solenoid valve is in the power-on state, the purificant recycling path is turned on, and the second purification component 5 provides the purified regeneration gas for the first purification component 1 to recycle the first purificant 12.

In the present embodiment, the solenoid valve does not need to be independently controlled, as long as the solenoid valve is connected with the external power supply 10 through the power supply interface 61, the purificant recycling path is turned on automatically to realize the heating recycling of the first purificant 12; and as long as the external power supply 10 is disconnected, the gas purification loop can be automatically turned on, so that the first purification component 1 provides the migration gas and the carrier gas for the ion migration tube 4. This embodiment can simplify the control mode, reduce the difficulty of using the ion mobility spectrometer, and reduce the possibility of misoperation.

In order to optimize the heating performance during the heating recycling of the first purificant 12, the first purification component 1 further includes a heat preservation layer 14, and the heat preservation layer 14 is coated at the outside of the first purification container 11 to prevent the heat provided by the heater 13 from dissipating to outside, thereby improving the heating efficiency, reducing the energy loss, and saving the energy.

Further, the first purification container 11 is provided with a temperature and humidity sensor 15 therein for monitoring the temperature and humidity of the first purificant 12 so as to stop the work of the heater 13 when the temperature in the first purification container 11 reaches a preset heating temperature, or perform heating recycling on the purificant when the humidity in the first purification container 11 reaches preset humidity.

In addition, the second purification component 5 can also adopt a structure similar to that of the first purification component 1. The second purification component 5 can include a second purification container 51 and a second purificant 52, and the second purification container 51 can be a cylindrical structure.

Further, the gas purification apparatus further includes a battery 7 and a charging component 8. The shell 6 is provided with a charging interface 62, the battery 7 is provided in the shell 6 and is connected with the charging interface 62, and the charging interface 62 can charge the battery 7 when being connected with the charging component 8. The battery 7 is used for supplying power to the ion migration tube 4 and components such as a pump 9 mentioned later. In the gas purification working state and the purificant recycling state, the charging component 8 can be connected with the external power supply 10 to charge the battery 7.

As shown in FIG. 1, the gas purification apparatus of the present disclosure further includes the pump 9, the pump 9 is located in the shell 6 and is located on a gas path between the second switching valve 3 and the first purification component 1. In the gas purification state, the pump 9 draws the air in the ion migration tube 4 into the first purification unit 1 for purification, and the pump 9 provides power for the flow of the gas in the gas purification loop. In the purificant recycling working state, the pump 9 draws the gas purified by the second purification component 5 into the first purification component 1 so as to provide the regeneration gas for the first purification component 1, and the pump 9 provides power for the flow of the gas in the purificant recycling path. In the present embodiment, by setting the pump 9, the efficiency of gas purification in the ion migration tube 4 can be improved, the efficiency of recycling the purificant can also be improved, and the performance of the ion mobility spectrometer can be optimized.

In addition, the present disclosure further provides a trace substance detection device, including the gas purification apparatus of the above embodiment. In one embodiment, the trace substance detection device is an ion mobility spectrometer or a gas chromatograph or the like. The trace substance detection device of the present disclosure at least has one of the following advantages:

(1) Since the gas purification apparatus can prevent secondary pollution in the purificant regeneration process and has relatively high reliability in the working states of gas purification and purificant regeneration, the trace substance detection device of the present disclosure can accurately and reliably detect the ingredient content of the substance, thereby optimizing the performance and the service life.

(2) Since the first purificant 12 in the gas purification apparatus does not need to be replaced, the first purificant 12 can be recycled only by externally connecting the second purification component 5, the trace substance detection device of the present disclosure is easy to maintain, so that the maintenance cost is low, and the working efficiency can be improved.

(3) Since the second purification component 5 in the gas purification apparatus is designed to be external and detachable, and the heater 13 is powered by the external power supply 10, the volume of the gas purification apparatus can be reduced, thereby reducing the volume of the trace substance detection device, reducing the weight, improving the portability of the device, and ensuring more flexible use.

The working principle of the ion mobility spectrometer of the present disclosure is described below by taking it as an example that the gas purification apparatus is used in the ion mobility spectrometer in conjunction with FIGS. 1 and 2.

FIG. 1 is a schematic diagram in which the ion mobility spectrometer is in a charging and purificant regeneration state. When charging and purificant regeneration are required, the power supply interface 61 of the portable ion mobility spectrometer is connected with the external power supply 10, the charging interface 62 is connected with the charging component 8, the gas tube interface 63 is connected with the outlet of the second purification container 51, and the switching valve 2 and the second switching valve 3 are energized. At this time, the heater 13 is in a state of heating the first purificant 12, the air enters the second purificant 52 through the inlet of the second purification container 51, and the purified gas flows to the gas tube interface 63, sequentially flows from the interface c of the second switching valve 3 to b, flows from the air inlet of the pump 9 to the air outlet, and enters the first purificant 12 from the inlet of the first purification container 11 to blow away the water vapor and impurities in the first purificant 12, and the water vapor and impurities flow from the interface b of the first switching valve 2 to the c and are finally discharged to the atmosphere.

FIG. 2 is a schematic diagram in which the ion mobility spectrometer is in a gas purification working state. When the ion mobility spectrometer is in the gas purification working state, the power supply interface 61 is disconnected with the external power supply 10, the charging component 8 is disconnected with the charging interface 62, the second purification component 5 is disconnected with the gas tube interface 63, and the first switching valve 2 and the second switching valve 3 are in a non-energized state. The gas pumped by the pump 9 from the ion migration tube 4 enters the first purificant 12 through the inlet of the first purification container 11 to purify the water vapor and impurities in the gas, and the obtained purified gas flows out from the outlet of the first purification container 11 and flows into the ion migration tube 4 through the interface b and the interface a of the first switching valve 2 to serve as a migration gas and a carrier gas of the ion migration tube 4, and then the gas is pumped out by the pump 9 from the ion migration tube 4 again to be purified again so as to form gas flow circulation.

The gas purification apparatus and the trace substance detection device provided by the present disclosure have been described in detail above. The principles and embodiments of the present disclosure have been described with reference to the specific embodiments herein, and the description of the above embodiments is only used for helping to understand the method of the present disclosure and the core idea thereof. It should be noted that, those of ordinary skill in the art can make several improvements and modifications to the present disclosure without departing from the principles of the present disclosure, and these modifications and modifications shall also fall within the protection scope of the claims of the present disclosure.

What is claimed is:

1. A gas purification apparatus, comprising:
    a shell, provided with a gas tube interface;
    a first purification component;
    a second purification component, located at the outside of the shell and detachable from the shell; and
    a switching component configured to switch between a first state and a second state;

in the first state, the first purification component and a component to be purified form a gas purification loop; and
    in the second state, the second purification component is installed on the gas tube interface to communicate with the first purification component and provides a regeneration gas for the first purification component, so that water vapor and impurities in the first purification component are discharged to outside.

2. The gas purification apparatus according to claim 1, wherein the switching component comprises a switching valve.

3. The gas purification apparatus according to claim 2, wherein the switching component comprises a first switching valve and a second switching valve; when both of the first switching valve and the second switching valve are in the first state, the first purification component and the component to be purified form the gas purification loop, and when both of the first switching valve and the second switching valve are in the second state, the second purification component provides the regeneration gas for the first purification component through the second switching valve, so as to discharge the water vapor and impurities regenerated by the first purification component to outside.

4. The gas purification apparatus according to claim 3, wherein when the second switching valve is in the second state, the second purification component communicates with the second switching valve from the outside of the shell through the gas tube interface.

5. The gas purification apparatus according to claim 1, wherein the first purification component comprises a first purification container, a first purificant and a heater; the first purificant is provided in the first purification container, and the heater is arranged at the outside of the first purification container for heating when the first purificant needs to be regenerated.

6. The gas purification apparatus according to claim 5, further comprising a shell provided with a power supply interface, and the heater is connected with the power supply interface, and the heater for being powered by an external power supply when the first purificant needs to be regenerated.

7. The gas purification apparatus according to claim 2, further comprising a shell provided with a power supply interface, the switching valve is a solenoid valve, the solenoid valve is connected with the power supply interface, the solenoid valve is configured to be powered by an external power supply, the first state is a power-off state of the solenoid valve, and the second state is a power-on state of the solenoid valve.

8. The gas purification apparatus according to claim 5, wherein the first purification component further comprises a heat preservation layer coated at the outside of the first purification container.

9. The gas purification apparatus according to claim 5, wherein a temperature and humidity sensor is arranged in the first purification container for monitoring the temperature and humidity of the first purificant.

10. The gas purification apparatus according to claim 1, further comprising a shell, a battery and a charging component, wherein a charging interface is provided on the shell, the battery is provided in the shell and is connected with the charging interface, and the charging interface for charging the battery when connected with the charging component.

11. The gas purification apparatus according to claim 3, wherein the first switching valve and the second switching valve are both two-position three-way solenoid valves, the two-position correspond to the first state and the second state respectively.

12. The gas purification apparatus according to claim 3, further comprising a pump provided on a gas path between the second switching valve and the first purification component.

13. The gas purification apparatus according to claim 1, wherein the component to be purified comprises an ion migration tube.

14. A trace substance detection device, comprising the gas purification apparatus according to claim 1.

15. The trace substance detection device according to claim 14, wherein the trace substance detection device comprises an ion mobility spectrometer or a gas chromatograph.

* * * * *